(12) United States Patent
Wu et al.

(10) Patent No.: US 8,437,698 B2
(45) Date of Patent: May 7, 2013

(54) METHOD AND APPARATUS FOR ESTIMATING TIME OF ARRIVAL

(75) Inventors: Gengshi Wu, Shenzhen (CN); Feng Li, Shenzhen (CN); Nian Peng, Shenzhen (CN); Shufan Huang, Shenzhen (CN); Jing Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 596 days.

(21) Appl. No.: 12/714,249

(22) Filed: Feb. 26, 2010

(65) Prior Publication Data

US 2010/0227560 A1 Sep. 9, 2010

(30) Foreign Application Priority Data

Mar. 3, 2009 (CN) .......................... 2009 1 0079144

(51) Int. Cl.
*H04B 1/00* (2006.01)
(52) U.S. Cl.
USPC .... 455/63.1; 455/67.11; 455/450; 455/67.13; 455/452.1; 455/501; 455/509; 370/329; 370/330; 370/341; 370/324; 375/145; 375/346; 375/348
(58) Field of Classification Search .................. 455/63.1, 455/67.11, 450, 452.1, 67.13, 452.2, 501–502, 455/509; 370/329, 330, 341, 342, 436, 437, 370/324, 346, 348, 144, 148
See application file for complete search history.

(56) References Cited

U.S. PATENT DOCUMENTS

| | | | | |
|---|---|---|---|---|
| 5,890,068 A | * | 3/1999 | Fattouche et al. | 455/456.2 |
| 6,453,168 B1 | * | 9/2002 | McCrady et al. | 455/517 |
| 6,493,380 B1 | * | 12/2002 | Wu et al. | 375/224 |
| 6,529,708 B1 | * | 3/2003 | Larsson et al. | 455/67.16 |
| 6,549,594 B1 | * | 4/2003 | Chen et al. | 375/355 |
| 6,606,501 B1 | | 8/2003 | Saha et al. | |
| 6,665,333 B2 | * | 12/2003 | McCrady et al. | 375/147 |
| 6,687,507 B2 | * | 2/2004 | Fischer et al. | 455/456.6 |
| 6,801,782 B2 | * | 10/2004 | McCrady et al. | 455/517 |
| 7,069,025 B2 | * | 6/2006 | Goren et al. | 455/456.2 |

(Continued)

FOREIGN PATENT DOCUMENTS

| | | |
|---|---|---|
| CN | 1901692 A | 1/2007 |
| CN | 101002396 A | 7/2007 |

OTHER PUBLICATIONS

3GPP: "3GPP TS 05.05 V8.20.0; Technical Specification Group GSM/EDGE Radio Access Network; Technical Specification Group GSM/EDGE Radio Access Network." Nov. 2005. total 100 pages.

*Primary Examiner* — Marceau Milord
(74) *Attorney, Agent, or Firm* — Conley Rose, P.C.; Grant Rodolph; Nicholas K. Beaulieu (57) ABSTRACT

Method and apparatus are provided for estimating Time of Arrival ("TOA"). The method includes: performing channel estimation according to a Normal Burst ("NB") free of interference and a local training sequence and generating a channel estimate, performing TOA estimation according to the channel estimate, and adjusting a synchronization position of the current NB according to a TOA estimation result. Interference to signals is cancelled before the TOA estimation, thus overcoming energy estimate deviation arising from interference in a strongly interfering radio environment, as occurs in the prior art, and preventing the impact on the TOA estimation. The disclosed methods and apparatus provide for more accurate energy estimates in a strongly interfering radio environment. The technical solution under the present invention does not require adjustment of the method of adjusting the search window.

13 Claims, 6 Drawing Sheets

U.S. PATENT DOCUMENTS

| | | | |
|---|---|---|---|
| 7,099,422 B2 * | 8/2006 | Hoctor et al. | 375/354 |
| 7,187,736 B2 | 3/2007 | Buckley et al. | |
| 7,221,913 B2 * | 5/2007 | Golden et al. | 455/67.16 |
| 7,269,427 B2 * | 9/2007 | Hoctor et al. | 455/456.2 |
| 7,499,711 B2 * | 3/2009 | Hoctor et al. | 455/456.1 |
| 7,643,541 B2 * | 1/2010 | Wagner et al. | 375/150 |
| 7,649,936 B2 * | 1/2010 | Wagner et al. | 375/240 |
| 7,746,939 B2 * | 6/2010 | McCrady | 375/260 |
| 8,208,939 B2 * | 6/2012 | Aljadeff et al. | 455/456.1 |
| 8,212,724 B2 * | 7/2012 | Dragon et al. | 342/464 |
| 8,238,408 B2 * | 8/2012 | Dubouloz et al. | 375/142 |
| 2005/0117676 A1 | 6/2005 | Liu | |
| 2006/0104387 A1 | 5/2006 | Sahinoglu et al. | |
| 2007/0021070 A1 | 1/2007 | Wessel et al. | |

* cited by examiner

METHOD AND APPARATUS FOR ESTIMATING TIME OF ARRIVAL

CROSS-REFERENCE TO RELATED APPLICATION

This application claims priority to Chinese Patent Application No. 200910079144.X entitled "Method and Apparatus for Estimating TOA" filed on Mar. 3, 2009, the disclosure of which is hereby incorporated by reference in its entirety.

FIELD OF THE INVENTION

The present invention relates to wireless communications, and in particular, to a method and an apparatus for estimating Time of Arrival (TOA) in a wireless communications system.

BACKGROUND

In the demodulation of the Global System for Mobile Communications (GSM), synchronization track breaks down into frequency track and timeslot header position track. The coarse synchronization of the frequency header position uses Frequency Burst (FB), and the coarse synchronization of the timeslot header position uses Synchronization Burst (SB). When the frequency is locked and the synchronization position is searched out, the mentioned two types of coarse synchronization stop. In order to track the multi-path change in the subsequent Normal Burst (NB) demodulation, it is necessary to perform symbol-level synchronization through the training sequence of the NB, measured in timeslots.

Figure 1:
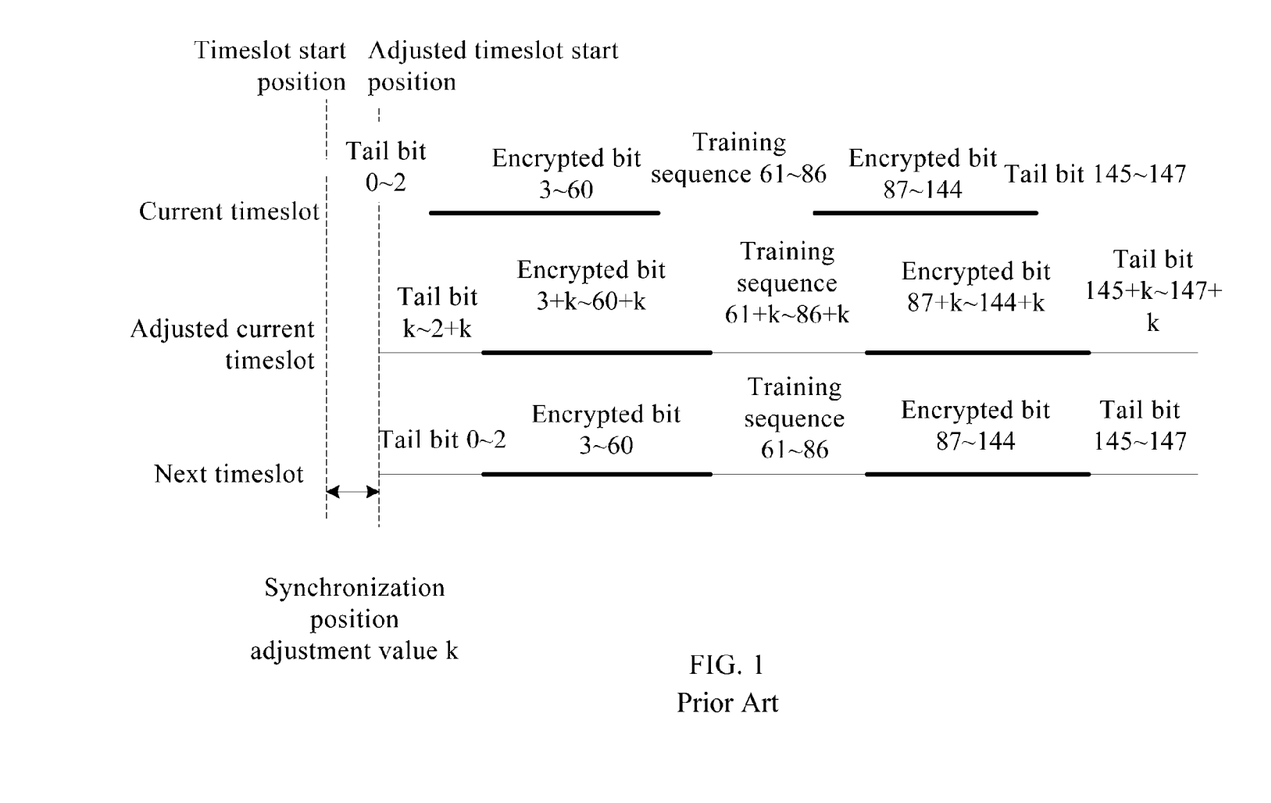
FIG. 1 shows synchronization position adjustment in the prior art.

FIG. 1 shows synchronization position adjustment in the prior art. As shown in FIG. 1, at the time of adjusting the synchronization position, if the synchronization position of the previous timeslot is a benchmark, channel estimation is performed in the windows of several symbols to the left side of the benchmark and in the windows of several symbols to the right side of the benchmark. The best synchronization position of the current timeslot is found through comparison between the energy value in one path and the energy value in another path, and the received signal of the current timeslot is adjusted. Meanwhile, this synchronization position serves as the benchmark position of the next NB.

Figure 2:
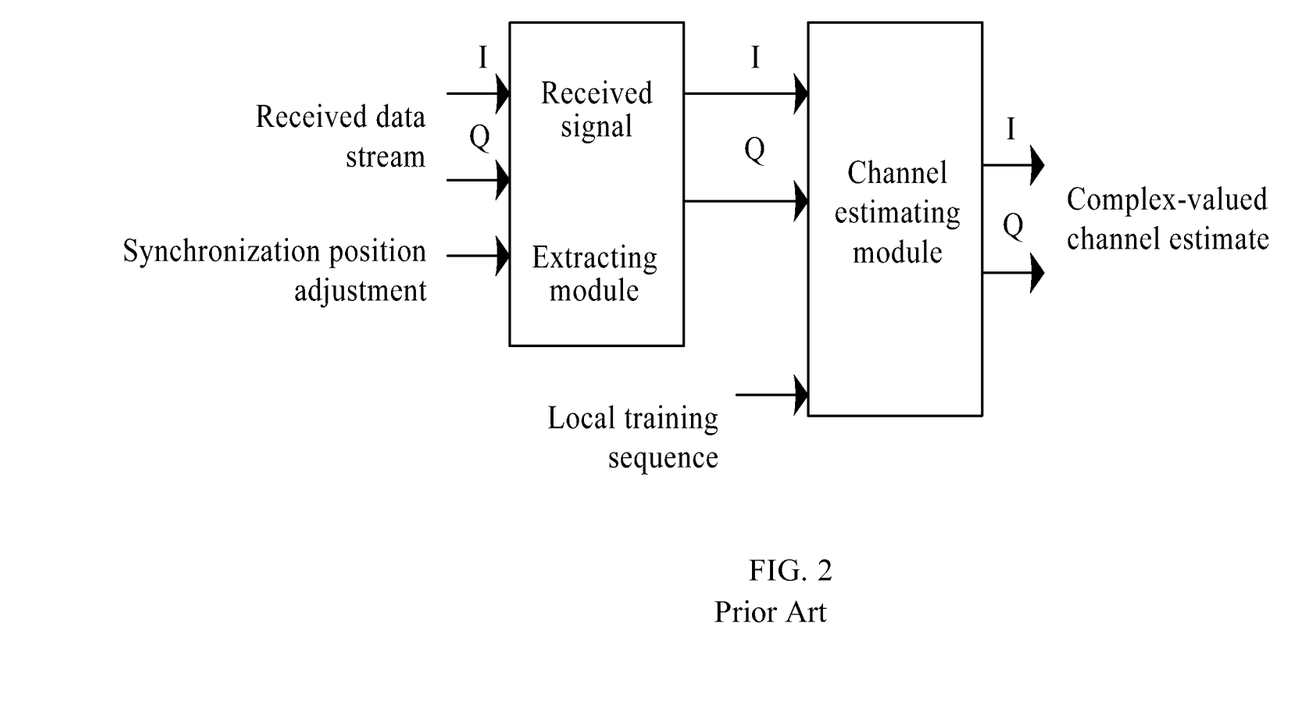
FIG. 2 shows a structure of a burst TOA estimation apparatus in the prior art.
Figure 3:
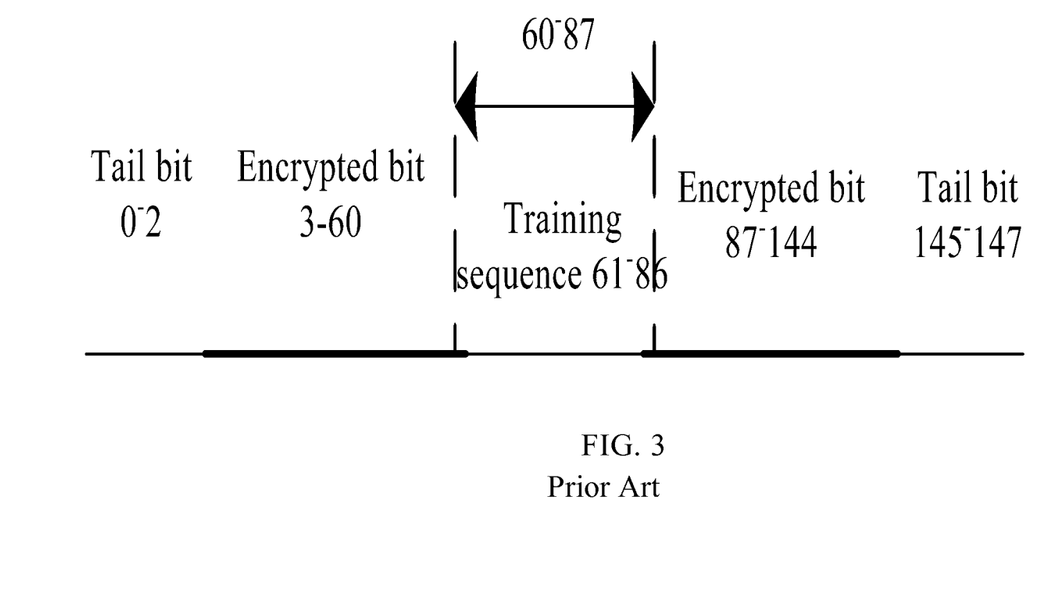
FIG. 3 shows symbols extracted by a signal extracting module in a burst TOA estimation apparatus in the prior art.

FIG. 2 shows a structure of a burst TOA estimation apparatus in the prior art. FIG. 3 shows symbols extracted by a signal extracting module in a burst TOA estimation apparatus in the prior art.

As shown in FIG. 2 and FIG. 3, the existing burst TOA estimation apparatus includes a received signal extracting module and a channel estimating module. The received signal extracting module extracts 28 symbols from the received signals of the current timeslot. The extracted signals are supposed to be Data_I(k),Data_Q(k),k=0, 1, . . . , 27.

The channel estimating module receives a local training sequence. The intermediate 16 bits of the local training sequence are TSC(k) k=0, 1, 2, . . . , 15.

The channel estimating module performs shift correlation for the received signals and the intermediate 16 bits of the local training sequence to obtain 13 complex-valued channel estimates.

$$\text{DataEST\_I}(k) = \left(\sum_{m=0}^{15} \text{Data\_I}(m+k) \times TSC(m)\right)$$

$k = 0, 1, 2, \ldots, 12$ $$\text{DataEST\_Q}(k) = \left(\sum_{m=0}^{15} \text{Data\_Q}(m+k) \times TSC(m)\right)$$

$k = 0, 1, 2, \ldots, 12$

Because the training sequence that has undergone reverse polarity mapping is ±1, the foregoing algorithm involves only addition.

The energy of the 13 channel estimates is calculated:

Energy($k$)=DataEST_$I(k)^2$+DataEST_$Q(k)^2$,$k$= 0,1,...,12.

For a single burst, the signals received in the burst are impacted by interference and noise, which may cause deviation of the estimated TOA position. Therefore, a filtering may be performed for the path energy estimate.

Energy$^2(k)$=α·Energy$^2(k)$+(1−α)·Energy$^{2-1}(k)$, $k$= 0,1,...,12, where·0<α<1.

The position of the multi-path energy window may vary with the TOA. Because the previous window position is different from the next window position, the definition formula of the α filtering needs to be corrected. For example, this multi-path window position deviates from the previous multi-path window position by one symbol.

For the old path position k, the α filtering is based on:

Energy$^t(k)$=α·Energy$^t(k)$+(1−α)·Energy$^{t-1}(k+1)$,$k$= 0,1,...,11.

For the path position k' generated by the new window, the α filtering is based on:

Energy$^t(k')$=α·Energy$^t(k')$, $k'$=12.

Afterward, the estimated energy values of the five adjacent channels are added up to obtain nine sums:

$$\text{SUM}[i] = \sum_{k=0}^{4} \text{Energy}(k+i), i = 0, 1, \ldots, 8.$$

Through the position of the maximum value of the nine sums, the estimated TOA value of the current burst is obtained.

In the process of developing the present invention, the inventor finds that: In the existing TOA estimation, the received signals are used directly for TOA estimation, the signals at the training sequence position of the received signals in the actual radio environment suffer interference (for example, common-frequency or adjacent-frequency interference from a surrounding cell). Therefore, the path energy estimate is not accurate. The TOA estimate obtained based on an incorrect path energy estimate is surely deviated from the correct TOA. The deviation further affects the selection of the search window position in the TOA estimation of the subsequent NB.

SUMMARY

The embodiments of the present invention provide a method and an apparatus for estimating Time of Arrival ("TOA") to overcome TOA estimation inaccuracy caused by energy estimate deviation arising from interference in a strongly interfering radio environment in the prior art, and implement a TOA estimation solution that works in a strongly interfering environment.

The TOA estimation method includes:

performing channel estimation according to an Normal Burst ("NB") free of interference and a local training sequence, and generating a channel estimate; and performing TOA estimation according to the channel estimate, and adjusting a synchronization position of the current NB according to a TOA estimation result.

The TOA estimation apparatus includes:

a first estimating module, adapted to perform channel estimation according to an NB free of interference and a local training sequence, and generate a channel estimate;

a second estimating module, adapted to perform TOA estimation according to the channel estimate; and an adjusting module, adapted to adjust the synchronization position of the current NB according to the TOA estimation result.

Through the embodiments of the present invention, the interference to signals is cancelled before the TOA estimation, thus overcoming energy estimate deviation arising from interference in a strongly interfering radio environment in the prior art and preventing the impact on the TOA estimation. Through the technical solution under the present invention, more accurate energy estimates are obtained in a strongly interfering radio environment. The technical solution under the present invention does not require adjustment of the method of adjusting the search window, and is not sensitive to fixed-point errors introduced in Single Antenna Interference Cancellation (SAIC).

DETAILED DESCRIPTION

The technical solution under the present invention is described below in more detail with reference to accompanying drawings and exemplary embodiments.

Figure 4:
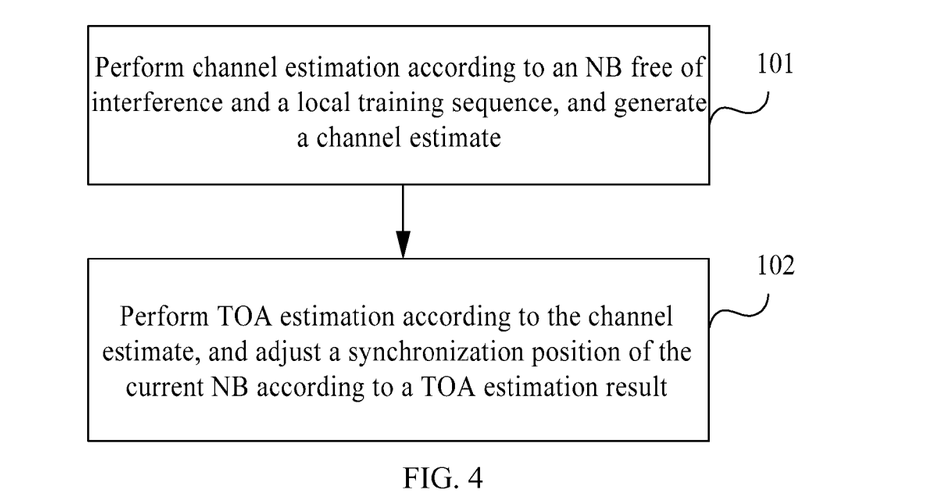
FIG. 4 shows a TOA estimation method in an embodiment of the present invention.

FIG. 4 shows a TOA estimation method in an embodiment of the present invention. As shown in FIG. 4, the TOA estimation method in this embodiment includes the following blocks:

Block 101: Cancel interference for multiple paths separately, add up the interference cancellation results of the multiple paths directly, perform channel estimation according to the local training sequence and the NB free of interference, and generate a channel estimate.

Block 102: Perform TOA estimation according to the channel estimate, and adjust the synchronization position of the current NB according to the TOA estimation result.

Through the embodiments of the present invention, the interference to signals is cancelled before the TOA estimation, thus overcoming energy estimate deviation arising from interference in a strongly interfering radio environment in the prior art and preventing the impact on the TOA estimation. Through the technical solution under the present invention, more accurate energy estimates are obtained in a strongly interfering radio environment. The technical solution under the present invention does not require adjustment of the method of adjusting the search window, and is not sensitive to fixed-point errors introduced in SAIC.

In this embodiment, extract a burst signal from the received signals. Specifically, if the received signal is the first NB, a burst signal is extracted from the received signals according to the synchronization position of the SB; if the received signal is not the first NB, a burst signal is extracted from the received signals according to the synchronization position of the previous SB.

Further, the interference cancellation in this embodiment is: canceling interference according to a filter coefficient. The filter coefficient minimizes the error between the local training sequence and the estimate of the local training sequence generated after the local training sequence is filtered according to the filter coefficient.

Figure 5:
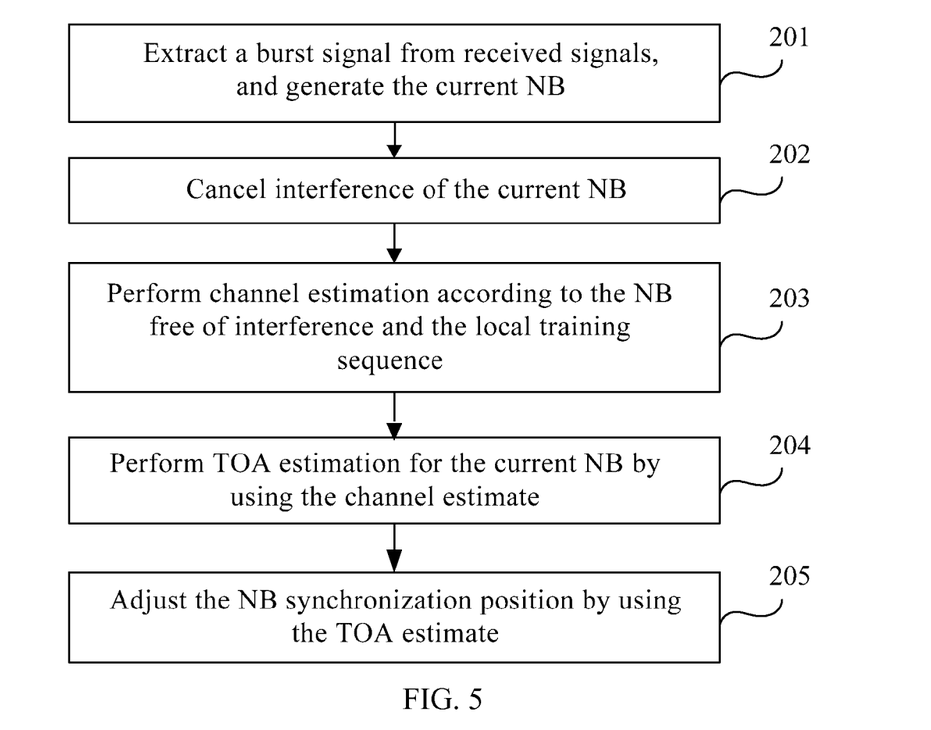
FIG. 5 shows another TOA estimation method in an embodiment of the present invention.

FIG. 5 shows another TOA estimation method in an embodiment of the present invention. As shown in FIG. 5, the TOA estimation method in this embodiment includes:

Block 201: Extract a burst signal from the received signals, and generate the current NB. Specifically, obtain precise timeslot timing by using the SB, and demodulate the synchronization channel to obtain the timing information of the timeslot, whereupon the mobile basestation begins to receive the NB. If the received signal is the first NB, obtain a burst signal according to the SB synchronization result before TOA estimation; if the received signal is not the first NB, extract a burst signal from the received signals according to the synchronization location of the previous NB.

Block 202: Cancel interference of the current NB. It is assumed that the model of the signal received in block 201 is $$r(k) = \sum_{n=0}^{N-1} h(n)d(k-n) + \sum_{m=0}^{M-1} p(m)b(k-m) + \ldots + \sum_{j=0}^{J-1} q(j)e(k-j) + n(k),$$

where: r(k) is a received signal, h(n) is an impulse response of the training sequence channel and its length is N, d(k) is a training sequence, p(m) and q(j) are impulse responses of the interference signal channel and their lengths are M and J respectively, b(k) and e(k) are interference signals (in practice, there may be more than two interference signals), and n(k) is white Gaussian noise.

A group of filter coefficients are used to filter the foregoing received signals to cancel interference. Such filter coefficients applied to filter the training sequence of the received signals minimize the error between the local training sequence and the estimate of the obtained training sequence.

For example, assuming that the training sequence numbered k is d(k), the interference of the training sequence is cancelled through $$\hat{d}(k) = \sum_{n=0}^{L-1} f(n)r(k-n-k0),$$

where: f(n) is a filter coefficient (the filter coefficient required by the interference cancellation algorithm), L is the length of the filter, r(k) is a received signal, k0 is a delay factor, d(k) is a training sequence, and d̂(k) is an estimate of the d(k), namely, the NB free of interference.

The error between the local training sequence and the estimate of the training sequence is defined as $$\text{Err} = \sum_{k=0}^{N_{TS}-1} |\hat{d}(k) - d(k)|^2,$$

where: Err is the error between the local training sequence and the estimate of the training sequence, and $N_{TS}$ is the length of the training sequence in the GSM burst (for the NB, $N_{TS}$ is 26 symbols).

In light of the features of the Gaussian Minimum Shift-frequency Keying (GMSK) modulation, if r(k) is the received signal sequence after demodulation, and the real part and the virtual part include the same information, the filter maps the virtual-part information to the real part. In this case, the error between the local training sequence and the estimate of the training sequence may also be defined as $$\text{Err} = \sum_{k=0}^{N_{TS}-1} |\text{Re}\{\hat{d}(k)\} - d(k)|^2,$$

where Re{.} represents obtaining of the real part.

If the filter coefficient and the received signals are expressed in the form of a real part and a virtual part, the channel estimation formula may be D̂=ZF, where:

$$\hat{D} = \begin{bmatrix} \hat{d}(0) \\ \hat{d}(1) \\ \ldots \\ \hat{d}(N_{TS}-1) \end{bmatrix}_{N_{TS} \times 1}$$

is a matrix of the estimates of the (NTS×1) training sequence, $$Z = \begin{bmatrix} r_r(-k0) & \ldots & r_r\begin{pmatrix} 1- \\ L-k0 \end{pmatrix} & -r_i(-k0) & \ldots & -r_i\begin{pmatrix} 1- \\ L-k0 \end{pmatrix} \\ r_r\begin{pmatrix} 1- \\ k0 \end{pmatrix} & \ldots & r_r\begin{pmatrix} 2- \\ L-k0 \end{pmatrix} & -r_i\begin{pmatrix} 1- \\ k0 \end{pmatrix} & \ldots & -r_i\begin{pmatrix} 2- \\ L-k0 \end{pmatrix} \\ \ldots \\ r_r\begin{pmatrix} N_{TS}- \\ 1-k0 \end{pmatrix} & \ldots & r_r\begin{pmatrix} N_{TS}- \\ L-k0 \end{pmatrix} & -r_i\begin{pmatrix} N_{TS}- \\ 1-k0 \end{pmatrix} & \ldots & -r_i\begin{pmatrix} N_{TS}- \\ L-k0 \end{pmatrix} \end{bmatrix}_{N_{TS} \times 2L}$$

is an observation matrix (real-number matrix) of the (NTS×2L) received signals, and $$F = \begin{bmatrix} f_r(0) \\ f_r(1) \\ \ldots \\ f_r(L-1) \\ f_i(0) \\ f_i(1) \\ \ldots \\ f_i(L-1) \end{bmatrix}_{2L \times 1}$$

is a (2L×1)-dimension filter coefficient matrix (real-number matrix).

According to the least square principle, the best filter coefficient is $F_{LS}=(Z^TZ)^{-1}Z^TD$, where $$D = \begin{bmatrix} d(0) \\ d(1) \\ \ldots \\ d(N_{TS}-1) \end{bmatrix}_{N_{TS} \times 1}$$

is the (NTS×1) training sequence matrix.

A group of best filter coefficients that can minimize the Err are used to filter the current NB, and the interference is cancelled.

The text above describes how to work out the best filter coefficient of a single-path SAIC. The foregoing interference cancellation method is also applicable to multi-path scenarios. In a multi-path scenario, each path corresponds to a different path delay k0, and the synchronization position may be in the interval of several symbols before or after the reference synchronization position of the NB. It is assumed that the number of paths is 5. The 5 paths are composed of 2 paths before the reference synchronization position, and 2 paths after the reference synchronization position, and the path in the reference synchronization position. Table 1 shows the delayed receiving vectors of 5 paths corresponding to the training sequence d(k).

TABLE 1

| Path | r(k) | r(k − 1) | r(k − 2) | r(k − 3) | r(k − 4) |
|---|---|---|---|---|---|
| Path 1(k0 = 0): | r(k) | r(k − 1) | r(k − 2) | r(k − 3) | r(k − 4) |
| Path 2(k0 = 1): | r(k + 1) | r(k) | r(k − 1) | r(k − 2) | r(k − 3) |
| Path 3(k0 = 2): | r(k + 2) | r(k + 1) | r(k) | r(k − 1) | r(k − 2) |
| Path 4(k0 = 3): | r(k + 3) | r(k + 2) | r(k + 1) | r(k) | r(k − 1) |
| Path 5(k0 = 4): | r(k + 4) | r(k + 3) | r(k + 2) | r(k + 1) | r(k) |

According to the interference cancellation coefficient obtained above, the 5 filter coefficients (whose length is L) of the 5 delayed paths are: $F_n=(Z_n^TZ_n)^{-1}Z_n^TD$, n=0, 1, ..., 4. The received signals are filtered with the calculated 5 filter coefficients, and the obtained value is divided by the noise value in each path, thus obtaining the NBs of the 5 paths of different delays free of interference. The NBs are added up to obtain an NB which is free of interference and available to channel estimation, and this NB is $\hat{d}_{TOA}=\{\hat{d}_{TOA}(0), \hat{d}_{TOA}(1), \ldots, \hat{d}_{TOA}(155)\}$.

Block 203: Perform channel estimation according to the NB free of interference and the local training sequence. Perform reverse polarity mapping for the intermediate 16 bits of the local training sequence to obtain TSC={k}, k=0, 1, ..., 15. Output the filtered signals which are available to TOA estimation, namely, extract 28 data from the NB free of interference, and use the 28 data as $\hat{d}_{TSC}$(m+k), namely, {$\hat{d}_{TOA}$(60), $\hat{d}_{TOA}$(61), ..., $\hat{d}_{TOA}$(87)}. Perform shift correlation for the extracted data and the Training Sequence Code (TSC) to obtain 13 complex-valued channel estimates, namely, $$ChanEST(k) = \sum_{m=0}^{15} \hat{d}_{TSC}(m+k) \times TSC(m), k = 0, 1, ..., 12.$$

Block 204: Perform TOA estimation for the current NB by using the channel estimate. Specifically, calculate an energy value according to the 13 channel estimates obtained in block 203, namely, Energy(k)=|ChanEST(k)|$^2$, k=0, 1, ..., 12, where Energy (k) is an energy value and ChanEST(k) is a channel estimate. Afterward, every 5 adjacent energy values are added up to generate 9 sums. The sum is calculated through this formula:

$$SUM[i] = \sum_{k=0}^{4} Energy(k+i), i = 0, 1, ..., 8.$$

Finally, the maximum value of the 9 sums is the current TOA estimate, and is expressed as $k_{MAX}$. In this case, the TOA estimate is: $Pos_{TOA}=k_{MAX}-4$.

Figure 6:
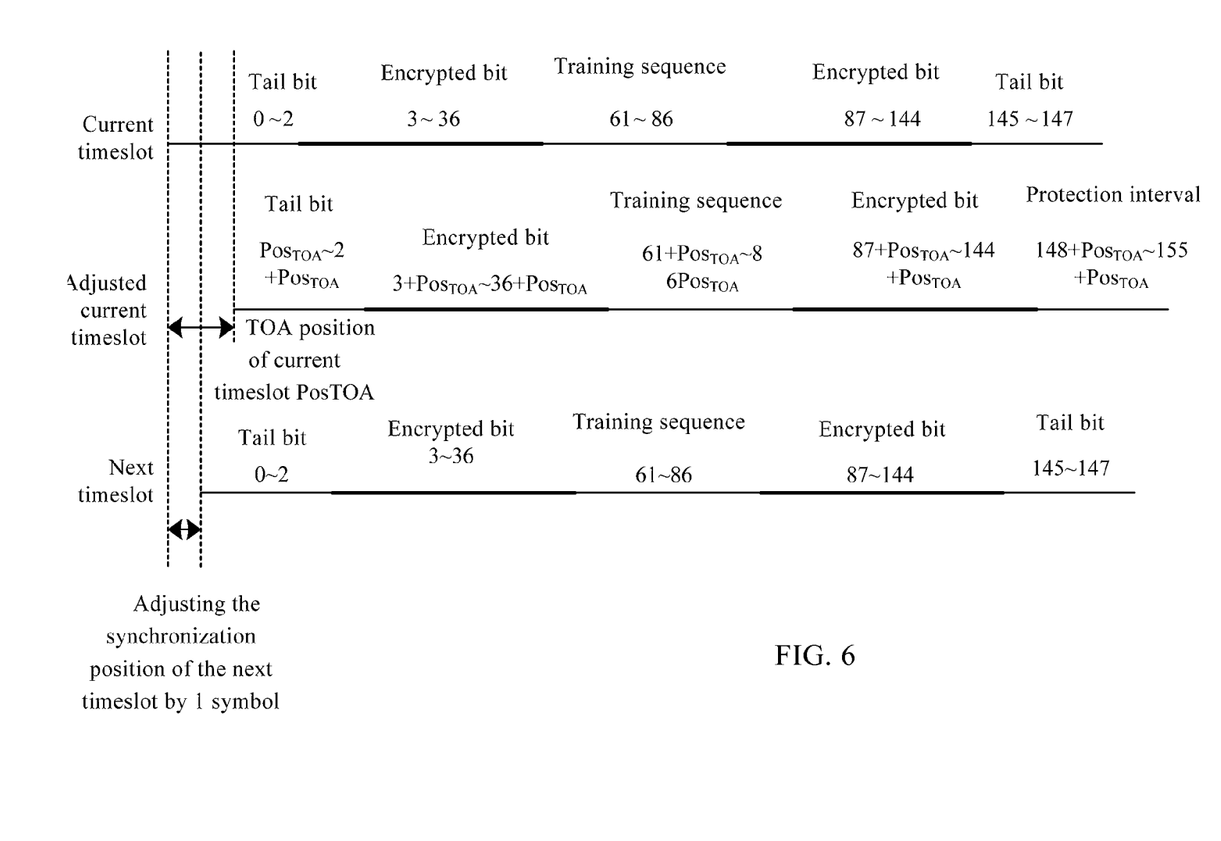
FIG. 6 shows adjustment of an NB synchronization position in an embodiment of the present invention.

Block 205: Adjust the NB synchronization position by using the TOA estimate. FIG. 6 shows adjustment of an NB synchronization position in an embodiment of the present invention. As shown in FIG. 6, after interference is cancelled on the current timeslot, the obtained TOA estimate is Pos-TOA. The current burst changes by PosTOA positions, and is then demodulated. For the next receiving timeslot, the received window position changes by one symbol in the same direction as the PosTOA.

Figure 7:
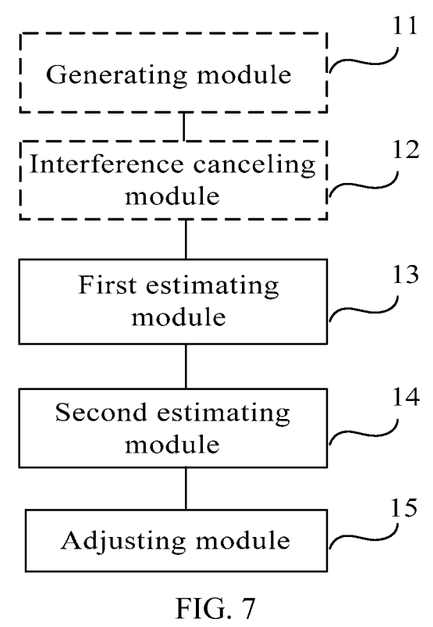
FIG. 7 shows a TOA estimation apparatus in an embodiment of the present invention.

FIG. 7 shows a TOA estimation apparatus in an embodiment of the present invention. As shown in FIG. 7, the TOA estimation apparatus in this embodiment includes:

a first estimating module 13, adapted to perform channel estimation according to an NB free of interference and a local training sequence, and generate a channel estimate;

a second estimating module 14, adapted to perform TOA estimation according to the channel estimate; and an adjusting module 15, adapted to adjust the synchronization position of the current NB according to the TOA estimation result.

Through the embodiments of the present invention, the interference to signals is cancelled before the TOA estimation, thus overcoming energy estimate deviation arising from interference in a strongly interfering radio environment in the prior art and preventing the impact on the TOA estimation. Through the technical solution under the present invention, more accurate energy estimates are obtained in a strongly interfering radio environment. The technical solution under the present invention does not require adjustment of the method of adjusting the search window, and is not sensitive to fixed-point errors introduced in SAIC.

The apparatus in this embodiment further includes:

a generating module 11, adapted to extract a burst signal from the received signals, and generate the current NB; and an interference canceling module 12, adapted to cancel interference for the current NB and generate an NB free of interference.

In this embodiment, the interference canceling module includes a first interference canceling sub-module, which is adapted to:

cancel interference for the current NB according to $$\hat{d}(k) = \sum_{n=0}^{L-1} f(n)r(k-n-k0),$$

where: f(n) is a filter coefficient, L is a filter length, r(k) is the current NB, n is the length of the received signal, k0 is a delay factor, and $\hat{d}(k)$ is the NB free of interference; and add up the interference cancellation results of multiple paths after canceling interference of the multiple paths respectively.

In this embodiment, the interference canceling module includes a second interference canceling sub-module, which is adapted to:

cancel interference for the current NB according to $\hat{D}=ZF$, where: $\hat{D}$ is the NB free of interference, Z is the current NB, and F is an interference coefficient; and add up the interference cancellation results of multiple paths after canceling interference of the multiple paths respectively.

Further, in this embodiment, the interference canceling module may include both a first interference canceling sub-module and a second interference canceling sub-module. In this case, the first interference canceling sub-module may be alternated with the second interference canceling sub-module to improve the lifespan of the interference canceling module.

Figure 8:
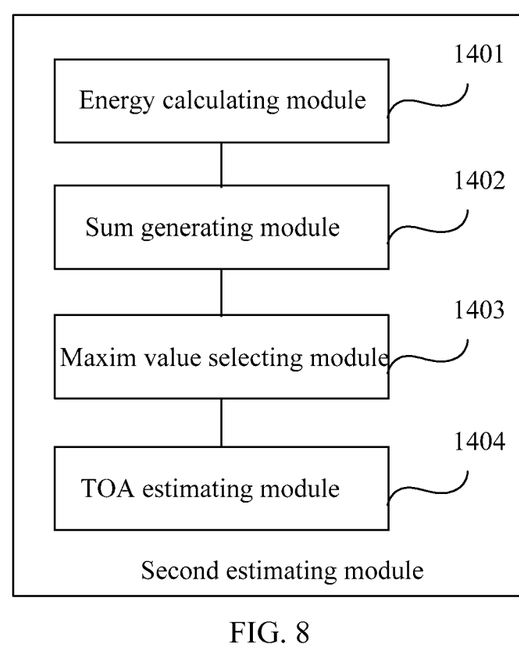
FIG. 8 shows a second estimating module in a TOA estimation apparatus in an embodiment of the present invention.

FIG. 8 shows a second estimating module in a TOA estimation apparatus in an embodiment of the present invention. As shown in FIG. 8, the second estimating module of the TOA estimation apparatus in this embodiment includes:

an energy calculating module 1401, adapted to calculate the energy of the channel estimate;

a sum generating module 1402, adapted to add up every 5 adjacent energy values to generate 9 sums;

a maximum value selecting module 1403, adapted to select the maximum value of the 9 sums; and a TOA estimating module 1404, adapted to generate a TOA estimate according to the maximum value.

In this embodiment, the working principles of the energy calculating module, sum generating module, maximum value selecting module, and TOA estimating module are elaborated in the TOA estimation method, and are not repeated here any further.

It is understandable to those skilled in the art that all or part of the steps of the foregoing method embodiments may be implemented by hardware instructed by a program. The program may be stored in a computer-readable storage medium. When being executed, the program performs steps of the foregoing method embodiments. The storage medium may be any medium suitable for storing program codes, for example, Read Only Memory (ROM), Random Access Memory (RAM), magnetic disk, or compact disk.

Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A Time of Arrival (TOA) estimation method comprising:
performing channel estimation according to a Normal Burst (NB) free of interference and a local training sequence and generating a channel estimate;
performing TOA estimation according to the channel estimate and adjusting a synchronization position of a current NB according to a TOA estimation result;
extracting a burst signal from received signals and generating the current NB; and
canceling interference for the current NB and generating the NB free of interference.

2. The TOA estimation method of claim 1, wherein if a received signal is a first NB, extracting the burst signal from the received signals comprises extracting the burst signal from the received signals according to the synchronization position of a Synchronization Burst (SB).

3. The TOA estimation method of claim 1, wherein if a received signal is not a first NB, extracting the burst signal from the received signals comprises extracting the burst signal from the received signals according to the synchronization position of a previous SB.

4. The TOA estimation method of claim 1, wherein canceling the interference for the current NB comprises canceling the interference according to a filter coefficient, and wherein the filter coefficient minimizes an error between a local training sequence and an estimate of the local training sequence generated after the local training sequence is filtered according to the filter coefficient.

5. The TOA estimation method of claim 4, wherein the canceling of the interference according to the filter coefficient comprises:
canceling the interference for the current NB according to:

$$\hat{d}(k) = \sum_{n=0}^{L-1} f(n)r(k-n-k0),$$

wherein f(n) is the filter coefficient, L is a filter length, r(k) is the current NB, n is a length of the received signals, k0 is a delay factor, and $\hat{d}(k)$ is the NB free of interference; and
adding up interference cancellation results of multiple paths after canceling interference of the multiple paths respectively.

6. The TOA estimation method of claim 4, wherein canceling the interference according to the filter coefficient comprises:
canceling the interference for the current NB according to:

$$\hat{D} = ZF$$

wherein $\hat{D}$ the NB free of interference, Z is the current NB, and F is an interference coefficient; and
adding up interference cancellation results of multiple paths after canceling interference of the multiple paths respectively.

7. A Time of Arrival (TOA) estimation method comprising:
performing channel estimation according to a Normal Burst (NB) free of interference and a local training sequence and generating a channel estimate;
performing TOA estimation according to the channel estimate and adjusting a synchronization position of a current NB according to a TOA estimation result, wherein the channel estimation performed according to the NB free of interference and the local training sequence comprises performing the channel estimation according to:

$$ChanEST(k) = \sum_{m=0}^{15} \hat{d}_{TSC}(m+k) \times TSC(m), k = 0, 1, \ldots, 12,$$

wherein ChanEST(k) are 13 channel estimates and $\hat{d}_{TSC}(m+k)$ is 61st-88th data among 156 data of the NB free of interference.

8. The TOA estimation method of claim 7, wherein the TOA estimation performed according to the channel estimate comprises:
calculating energy of the 13 channel estimates according to:

Energy$(k)=|$ChanEST$(k)|^2, k=0,1,\ldots,12,$ wherein Energy(k) is the energy of the 13 channel estimates; and
adding up every 5 adjacent energy values to generate 9 sums and generating a TOA estimate which is a maximum value of the 9 sums.

9. The TOA estimation method of claim 8, wherein the adding up of the every 5 adjacent energy values to generate the 9 sums and generating the TOA estimate which is the maximum value of the 9 sums comprises:
adding up 5 adjacent energy values to generate the 9 stuns according to:

$$SUM[i] = \sum_{k=0}^{4} Energy(k+i), i = 0, 1, \ldots, 8$$

selecting the maximum value of the 9 sums; and
performing the TOA estimation for the current NB according to the maximum value and according to:

Pos$_{TOA} = k_{MAX} - 4,$ wherein Pos$_{TOA}$ is the TOA estimate of the current NB, and $k_{MAX}$ is the maximum value of the 9 sums.

10. A Time of Arrival (TOA) estimation apparatus comprising:
a first estimating module adapted to perform channel estimation according to a Normal Burst (NB) free of interference and a local training sequence and generate a channel estimate;
a second estimating module adapted to perform TOA estimation according to the channel estimate;
an adjusting module adapted to adjust a synchronization position of a current NB according to a TOA estimation result;
a generating module adapted to extract a burst signal from received signals and generate the current NB; and
an interference canceling module adapted to cancel interference for the current NB and generate the NB free of interference.

11. The TOA estimation apparatus of claim 10, wherein the interference canceling module comprises a first interference canceling sub-module adapted to:

cancel the interference for the current NB according to:

$$\hat{d}(k) = \sum_{n=0}^{L-1} f(n)r(k-n-k0),$$

wherein f(n) is a filter coefficient, L is a filter length, r(k) is the current NB, n is a length of the received signals, k0 is a delay factor, and $\hat{d}(k)$ is the NB free of interference; and add up interference cancellation results of multiple paths after canceling interference of the multiple paths respectively.

12. The TOA estimation apparatus of claim 10, wherein the interference canceling module comprises a second interference canceling sub-module adapted to:

cancel the interference for the current NB according to:

$\hat{D}=ZF,$ wherein $\hat{D}$ is the NB free of interference, Z is the current NB, and F is an interference coefficient; and add up interference cancellation results of multiple paths after canceling interference of the multiple paths respectively.

13. A Time of Arrival (TOA) estimation apparatus comprising:

a first estimating module adapted to perform channel estimation according to a Normal Burst (NB) free of interference and a local training sequence, and generate a channel estimate;

a second estimating module adapted to perform TOA estimation according to the channel estimate; and an adjusting module adapted to adjust a synchronization position of a current NB according to a TOA estimation result, wherein the second estimating module comprises:

an energy calculating module adapted to calculate energy of the channel estimate;

a sum generating module adapted to add up every 5 adjacent energy values to generate 9 sums;

a maximum value selecting module adapted to select a maximum value of the 9 sums; and a TOA estimating module adapted to generate a TOA estimate according to the maximum value.

* * * * *

UNITED STATES PATENT AND TRADEMARK OFFICE
CERTIFICATE OF CORRECTION

PATENT NO. : 8,437,698 B2
APPLICATION NO. : 12/714249
DATED : May 7, 2013
INVENTOR(S) : Gengshi Wu et al.

It is certified that error appears in the above-identified patent and that said Letters Patent is hereby corrected as shown below:

In the Claims

Claim 6, Column 9/Line 56 should read: "wherein $\hat{D}$ is the NB free of interference, Z is the current NB,"

Signed and Sealed this
Eighth Day of April, 2014

Michelle K. Lee
*Deputy Director of the United States Patent and Trademark Office*